Figure 1:
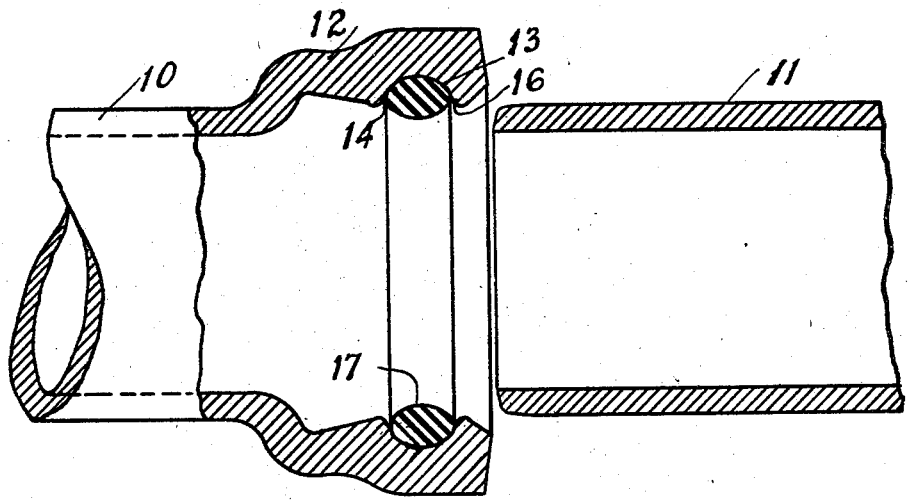

Dec. 19, 1944.  A. T. McWANE  2,365,574
PIPE JOINT
Filed Oct. 21, 1943

INVENTOR
ARTHUR T. McWANE
BY
ATTORNEY

Patented Dec. 19, 1944

2,365,574

UNITED STATES PATENT OFFICE 2,365,574

PIPE JOINT

Arthur T. McWane, Birmingham, Ala., assignor to McWane Cast Iron Pipe Company, a corporation of Alabama Application October 21, 1943, Serial No. 507,083

1 Claim. (Cl. 285—163)

This invention relates to mechanical joints for metal pipe and fittings having bell and spigot ends, and has for its object the provision of a joint which shall be simple and economical of manufacture, easy to install, which shall be capable of withstanding pressures without leaking varying from sub-atmospheric to the highest practicable working pressures, and which shall resist separation due to internal pressures, up to all practicable working pressures.

In my prior Patent No. 2,146,641 dated February 7, 1939, there is shown, described and claimed a pipe joint in which an annular rubber gasket, normally circular in cross section is seated in an arcuate groove in the bell end of a pipe section and is compressed by the insertion of the spigot end of another section of pipe into the bell, to cause the gasket to tightly hug the groove in the bell end of the pipe and to flatten against the spigot end of the engaging pipe, thus providing considerable surface area of engagement of the gasket with the spigot end of the pipe. Pipe joints constructed in accordance with my patent aforesaid have proven eminently successful in use and are capable of withstanding pressures higher than were considered therefore possible, even with bolted or screwed mechanical joints. I have found, however, that with the joint disclosed in my said patent, the internal pressure reacting between the spigot and the bell ends, when the pressure is initially applied, tends to separate the pipe sections and this tendency continues for a few days until the rubber takes its "set." It is therefore most desirable to provide means for preventing such initial separation, especially where the pipe is subjected to heavy pressures. It is accordingly the prime object of my present invention to provide a pipe joint having equal or superior pressure retaining characteristics as compared with the joint of my said patent, and which shall be capable of withstanding all practicable working pressures without initial separation of the pipe sections due to internal pressures.

As is well-known in the art to which my invention relates, rubber gaskets, when compressed to form a joint, must be closely confined on all sides or else the rubber will flow and lose its elasticity and power to retain pressure. In accordance with my present invention I provide a joint complying with all of the foregoing limitations but which provides a much greater surface area in contact with the spigot end of the pipe, and greater radial compression when installed, than does a comparable gasket such as disclosed in my prior patent aforesaid.

In accordance with my present invention, instead of a rubber gasket, circular in cross section, as disclosed in my prior patent, my improved gasket is elliptical in cross section and is seated in a correspondingly shaped groove in the bell end of the pipe. The gasket is compressed between the groove and spigot by mere insertion of the spigot end of the pipe section into the bell so that it fills the groove and is flattened against the spigot end of the pipe section providing a substantially greater area of contact with the spigot end of the pipe section. Also the clearance between the spigot and the bell is so limited that the gasket is substantially confined in all sides. I have found that this change in shape, as compared with the gasket of my prior patent, has accomplished unanticipated results in the way of withstanding internal pressures and resisting separation of bell and spigot at exceedingly high pressures. For example, where a joint formed with a round gasket would initially separate under ordinary city water pressure of from 65 to 80 lbs. per sq. in., a comparable joint having a gasket elliptical in cross section would withstand as much as 275 lbs. of pressure without separation initially or immediately after being installed, and up to 1300 lbs. per sq. in. pressure without separation or leakage after being installed three days. Also, joints having the gasket elliptical in cross section therein are capable of withstanding as great a pressure without leaking, as the pipe itself will withstand, without breaking, because the higher the pressure the tighter the joint.

Figure 2:
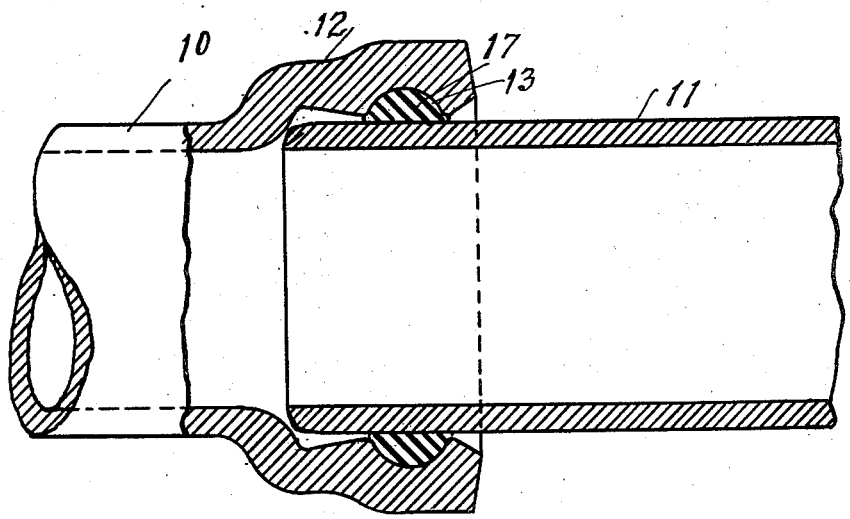

A packing joint embodying features of my invention is illustrated in the accompanying drawing, forming a part of this application, in which Fig. 1 is a cross sectional view showing the bell and spigot ends of adjacent cast iron pipe sections having my improved joint; and Fig. 2 is a similar view showing the joint assembled.

Referring to the drawing, I show two adjacent sections of pipe 10 and 11. The section 10 has a bell end 12, having formed therein a groove 13, which is semielliptical in cross section, with the transverse axis of the ellipse parallel with the long axis of the pipe.

As shown the groove 13 has flaring sides 14 and 16, adjacent the surface of the bell to permit elongation of the gasket axially upon compression. The end of the section 11, or spigot portion of the joint, is smooth and in the case of cast iron pipe should have the rough sand surface ground off before assembly of the joint. As shown in Fig. 2 it has relatively close clearance with respect to the bell end 12, only sufficient clearance being provided to permit ready insertion of the spigot member into the bell. Seated in the groove 13 is a rubber gasket 17 which is elliptical in transverse cross section and which fits snugly in the groove 13. Insertion of the spigot end 11 into the bell 12 compresses the gasket 17, causing it to fill the flared portion of the groove 13 and to engage the surface of the spigot portion 11 over a substantial area, which area is substantially greater than the long cross sectional axis of the elliptical gasket.

As an example of the comparative results obtained with round and elliptical gaskets in the same size pipe joint, I have found that under compression, due to insertion of the spigot in the bell the round gasket was compressed radially approximately 21% of its cross sectional diameter, and was elongated axially 8.3% of its diameter; the elliptical gasket, in the same size joint was compressed, radially of the pipe, 38% of its conjugate axis and was elongated or flattened to grip the pipe axially over an area 27% wider than the length of its transverse axis.

The method of assembly of my improved joint will be apparent from the foregoing description. The gasket 17 is placed in the groove 13 in the bell end of the pipe section and if desired may be lubricated with soapy water. The spigot member is inserted in the bell end and may be pulled to normal assembled position by any suitable pulling rig, not shown. The insertion of the spigot member wipes the soapy water off the gasket so that it does not permit ready disassembly of the pipe. In fact, pipe sections may be assembled above ground and dragged to position without breaking joints. When assembled, the gasket is under compression and is substantially completely confined in all directions so that it cannot flow. Accordingly, the joint remains bottle tight regardless of variations in line working pressures or movements of the pipe sections due to contraction and expansion, settling, or earth movements.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claim.

What I claim is:

A mechanical packing joint for bell and spigot pipe and fittings comprising a relatively smooth spigot member, a bell member having clearance with respect to the spigot member just sufficient to permit ready insertion of the spigot member and having a groove therein semielliptical in cross section with its transverse axis parallel with the axis of the pipe section, an annular rubber gasket elliptical in transverse cross section fitting snugly in the groove and adapted to surround the spigot, said gasket being smaller in internal diameter than the outer diameter of the spigot, whereby upon insertion of the spigot member into the bell member and gasket, the gasket is elongated axially of the pipe to grip the spigot member over a surface area substantially wider than the transverse cross sectional diameter of the elliptical gasket.

ARTHUR T. McWANE.